US010932165B2

(12) United States Patent
Eriksson et al.

(10) Patent No.: US 10,932,165 B2
(45) Date of Patent: Feb. 23, 2021

(54) OSS NODE, NETWORK NODE AND METHODS PERFORMED THEREIN

(71) Applicant: Telefonaktiebolaget LM Ericsson (publ), Stockholm (SE)

(72) Inventors: Hans Eriksson, Sollentuna (SE); Lars Westberg, Enköping (SE); Hans Hannu, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 127 days.

(21) Appl. No.: 16/068,586

(22) PCT Filed: Jan. 28, 2016

(86) PCT No.: PCT/SE2016/050055
§ 371 (c)(1),
(2) Date: Jul. 6, 2018

(87) PCT Pub. No.: WO2017/131565
PCT Pub. Date: Aug. 3, 2017

(65) Prior Publication Data
US 2019/0014508 A1   Jan. 10, 2019

(51) Int. Cl.
*H04W 36/00* (2009.01)
*H04L 29/12* (2006.01)
(Continued)

(52) U.S. Cl.
CPC ....... *H04W 36/0022* (2013.01); *H04L 61/256* (2013.01); *H04L 69/164* (2013.01); *H04W 40/36* (2013.01); *H04W 36/0038* (2013.01)

(58) Field of Classification Search
CPC ............. H04W 36/0022; H04W 40/36; H04L 61/256; H04L 69/164
See application file for complete search history.

(56) References Cited

U.S. PATENT DOCUMENTS

2009/0285175 A1   11/2009   Nix
2010/0121985 A1*   5/2010   Gotare .............. H04L 29/12415
                                               709/249
(Continued)

FOREIGN PATENT DOCUMENTS

EP            2132918 B1        9/2010

OTHER PUBLICATIONS

International Search Report and Written Opinion for International Application No. PCT/SE2016/050055, dated Oct. 5, 2016, 11 pages.
(Continued)

*Primary Examiner* — Michael Thier
*Assistant Examiner* — Brian P Cox
(74) *Attorney, Agent, or Firm* — Patent Portfolio Builders, PLLC

(57) ABSTRACT

A method performed by an Operation and Support System (OSS) node for handling communication between a wireless device and a communication network node in a communication network, which communication network comprises a first radio access node associated with a first gateway and a second radio access node associated with a second gateway. The OSS node determines to initiate a change of an Internet Protocol (IP) address for the wireless device. The OSS node further identifies a session of packets for the wireless device, which session is run over a protocol that supports session continuity even though source or destination IP addresses change in the packets. Furthermore, the OSS node triggers the change of the IP address associated with the first gateway for the wireless device, of packets of the session, to a changed IP address associated with the second gateway.

18 Claims, 10 Drawing Sheets

(51) Int. Cl.
*H04W 40/36* (2009.01)
*H04L 29/06* (2006.01)

(56) References Cited

U.S. PATENT DOCUMENTS

| | | | |
|---|---|---|---|
| 2014/0258705 A1 | 9/2014 | Roskind et al. | |
| 2015/0016416 A1* | 1/2015 | Hawkes | H04W 36/0016 370/331 |
| 2015/0029987 A1* | 1/2015 | Addepalli | H04W 72/0406 370/329 |
| 2015/0163704 A1* | 6/2015 | Catovic | H04W 36/0038 370/331 |
| 2015/0200845 A1* | 7/2015 | Roskind | H04L 69/22 370/241 |
| 2016/0105825 A1* | 4/2016 | Hedberg | H04W 8/26 370/331 |

OTHER PUBLICATIONS

3GPP TS 23.402, "3rd Generation Partnership Project; Technical Specification Group Services and System Aspects; Architecture enhancements for non-3GPP accesses (Release 13)," Sep. 2015, 298 pages, V13.3.0, 3GPP Organizational Partners.
D. Awduche et al., "Overview and Principles of Internet Traffic Engineering," May 2002, 83 pages, Network Working Group, RFC 3272, The Internet Society.
Office Action issued in corresponding EP Application No. 16705849.4 dated Aug. 6, 2019, 04 Pages.

* cited by examiner

OSS NODE, NETWORK NODE AND METHODS PERFORMED THEREIN

CROSS-REFERENCE TO RELATED APPLICATIONS

This application is a National stage of International Application No. PCT/SE2016/050055, filed Jan. 28, 2016, which is hereby incorporated by reference.

TECHNICAL FIELD

Embodiments herein relate to an Operation and Support System (OSS) node, a network node and methods performed therein for communication. Furthermore, a computer program and a computer readable storage medium are also provided herein. In particular, embodiments herein relate to handling communication between a wireless device and a communication network node, e.g. an internet server, in a communication network.

BACKGROUND

In a typical communication network, wireless devices, also known as wireless communication devices, mobile stations, stations (STA) and/or user equipments (UEs), communicate via a Radio Access Network (RAN) to one or more core networks. The RAN covers a geographical area which is divided into areas or cell areas, with each area or cell area being served by an access node e.g. a transmission point such as a Wi-Fi access point or a radio base station (RBS), which in some networks may also be denoted, for example, a "NodeB" or "eNodeB". The area or cell area is a geographical area where radio coverage is provided by the access node. The access node communicates over an air interface operating on radio frequencies with the wireless device within range of the access node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks and UTRAN specifically, and investigate enhanced data rate and radio capacity. In some RANs, e.g. as in UMTS, several access nodes may be connected, e.g., by landlines or microwave, to a controller node, such as a radio network controller (RNC) or a base station controller (BSC), which supervises and coordinates various activities of the plural access nodes connected thereto. This type of connection is sometimes referred to as a backhaul connection. The RNCs are typically connected to one or more core networks.

Specifications for the Evolved Packet System (EPS) have been completed within the 3$^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access technology wherein the access nodes are directly connected to the EPC core network rather than to RNCs. In general, in E-UTRAN/LTE the functions of an RNC are distributed between the access nodes, e.g. eNodeBs in LTE, and the core network. As such, the Radio Access Network (RAN) of an EPS has an essentially "flat" architecture comprising access nodes connected directly to one or more core networks, i.e. they are not connected to RNCs. To compensate for that, the E-UTRAN specification defines a direct interface between the access nodes, this interface being denoted the X2 interface.

Whenever a wireless device, such as mobile phone, computer, tablet or server, is attached to an Internet Protocol (IP) network, it is assigned an IP address. The IP address is used to identify and locate the wireless device in the IP network. Routers are network nodes that steer IP packets towards their destination using the IP address information in an IP packet header. IP packets from the same sender towards the same receiver may take different routes through the network depending on the routing algorithm. The routing algorithm of a router may take inputs such as delay and packet loss, i.e. sign of congestion, of the different routes into the decision of which next node it will send the IP packet to.

Internet traffic engineering disclosed in Request For Comments 3272 (RFC3272) which is a memo describing the principles of Traffic Engineering (TE) in the Internet and deals with performance evaluation and optimization of operational IP networks. One of the functions performed by Internet traffic engineering is a control and optimization of the routing function, i.e a function determining how to steer traffic through the communication network in the most effective way.

An Internet Service Provider (ISP) usually has its own private network where users connect their wireless devices to via a broadband router. The ISP network is connected to other ISPs' networks and Internet via a gateway. This gateway is often referred to as an IP point of presence (PoP). Usually an ISP has several gateways and thus several IP points of presence.

When a user connects its wireless device to the ISP the wireless device is assigned an IP-address. This IP address may be a public address, i.e. direct addressable by other network nodes on Internet, or it may be a private address only addressable by other network nodes attached to the ISP network. If the IP address is private there is a need to have a Network Address Translation (NAT) function in a Gateway (GW) that connects the private network to the Internet. The NAT maps the private IP address to a public IP address that network nodes on Internet use when the network nodes address the wireless device. Hence, the job of the NAT is to replace a source IP address of the outgoing packets from the private IP address to the public IP address, and for incoming packet it replaces the destination IP address from the public IP address to the private IP address.

When a wireless device in a 3GPP network connects to the network it is assigned an IP-address by the Core Network using the Packet Data Protocol (PDP) context signaling during the attaching of the wireless device. As a wireless device moves geographically it keeps its assigned IP address, both public and private, until it disconnects (detach) from the communication network.

One reason for keeping the IP address is due to signaling needed to change the IP address and that if the wireless device has an ongoing Transport Control Protocol (TCP) connection a change of IP address would mean that the TCP connection is terminated, and the application layer, and TCP session, has to be re-established which takes 3 round trip times with Transport Layer Security (TLS) over TCP and the TCP slow start phase is re-initiated which results in longer object download times, such as web page download times.

Nowadays a wireless device often supports at least WiFi and 3GPP based, such as LTE, 3G, GSM, access technologies. In 3GPP TS 23.402 v.13.3.0, 3GPP and WiFi integration is specified. Often a wireless device is assigned one IP address for the 3GPP access and another for the WiFi access. Hence, the wireless device has at least two IP addresses that it can be addressed via. Sometimes the integrated networks will preserve the IP address of the wireless device in order to have session continuation. This requires that the wireless device supports some Mobile IP solution. A final decision on the IP mobility management mechanism is made by a Home Subscriber Server (HSS)/Authentication, Authorization and Accounting (AAA) 3GPP node upon wireless device authentication in the trusted non-3GPP access system.

One problem of keeping the IP address is the potential sub-optimal routing when a wireless device moves geographically. IP-packets coming from Internet will be routed towards the wireless device IP point of presence of the ISP, which may be causing sub optimal routing due to overload situations or simply that the wireless device has moved further away for the IP point of presence resulting in reduced user throughput.

The current solutions for IP mobility management is quite complex and requires interaction between network nodes in the integrated network along with signaling to the wireless device. Still this may not work as the wireless device may not support the network preferred IP mobility management solution, thereby, reducing the performance of the communication network.

SUMMARY

An object of embodiments herein is to provide a mechanism for improving performance of the communication network in an efficient manner.

According to an aspect the object is achieved by a method performed by an Operation and Support System (OSS) node for handling communication between a wireless device and a communication network node in a communication network. The communication network comprises a first radio access node associated with a first gateway and a second radio access node associated with a second gateway. The OSS node determines to initiate a change of an Internet Protocol (IP) address for the wireless device. The OSS node further identifies a session of packets for the wireless device, which session is run over a protocol that supports session continuity even though source or destination IP addresses change in the packets. The OSS node also triggers the change of the IP address associated with the first gateway for the wireless device, of packets of the session, to a changed IP address associated with the second gateway.

According to another aspect the object is achieved by a method performed by a network node for handling communication between a wireless device and a communication network node in a communication network. The communication network comprises a first radio access node associated with a first gateway and a second radio access node associated with a second gateway. The network node receives a request from an OSS node, which request is requesting the network node to initiate a change of an IP address associated with the first gateway or the second gateway for the wireless device, of packets of a session for the wireless device, to a changed IP address associated with the second gateway or the first gateway. The network node further changes the IP address associated with the first gateway or the second gateway for the wireless device, of one or more packets of the session to the changed IP address associated with the second gateway or the first gateway. The network node also forwards the one or more packets of the session towards the communication network node or the wireless device.

According to yet another aspect the object is achieved by providing an OSS node for handling communication between a wireless device and a communication network node in a communication network. The communication network comprises a first radio access node associated with a first gateway and a second radio access node associated with a second gateway. The OSS node is configured to determine to initiate a change of an IP address for the wireless device. The OSS node is further configured to identify a session of packets for the wireless device, which session is run over a protocol that supports session continuity even though source or destination IP addresses change in the packets. The OSS node is also configured to trigger the change of the IP address associated with the first gateway for the wireless device, of packets of the session, to a changed IP address associated with the second gateway.

According to still another aspect the object is achieved by providing a network node for handling communication between a wireless device and a communication network node in a communication network. The communication network comprises a first radio access node associated with a first gateway and a second radio access node associated with a second gateway. The network node is configured to receive a request from an OSS node, which request is requesting the network node to initiate a change of an IP address associated with the first gateway or the second gateway for the wireless device, of packets of a session for the wireless device, to a changed IP address associated with the second gateway or the first gateway. The network node is further configured to change the IP address associated with the first gateway or the second gateway for the wireless device, of one or more packets of the session to the changed IP address associated with the second gateway or the first gateway. The session is run over a protocol that supports session continuity even though source or destination IP addresses change in the one or more packets. The network node is further configured to forward the one or more packets of the session towards the communication network node or the wireless device.

It is furthermore provided herein a computer program comprising instructions, which, when executed on at least one processor, cause the at least one processor to carry out any of the methods above, as performed by the OSS node or the network node. It is additionally provided herein a computer-readable storage medium, having stored thereon a computer program comprising instructions which, when executed on at least one processor, cause the at least one processor to carry out the method according to any of the methods above, as performed by the OSS node or the network node.

Embodiments herein introduce an efficient manner of handling communication by efficiently routing packets of a session that is run over a protocol that supports session continuity even though source or destination IP addresses change in one or more packets. According to embodiments herein the one or more packets are routed to and/or from the wireless device via the second gateway instead of the first gateway and thereby the one or more packets are routed more efficiently through the communication network as e.g. the second gateway is closer to the wireless device or due to load balancing between the gateways.

BRIEF DESCRIPTION OF THE DRAWINGS

Embodiments will now be described in more detail in relation to the enclosed drawings, in which.

DETAILED DESCRIPTION

Figure 1:
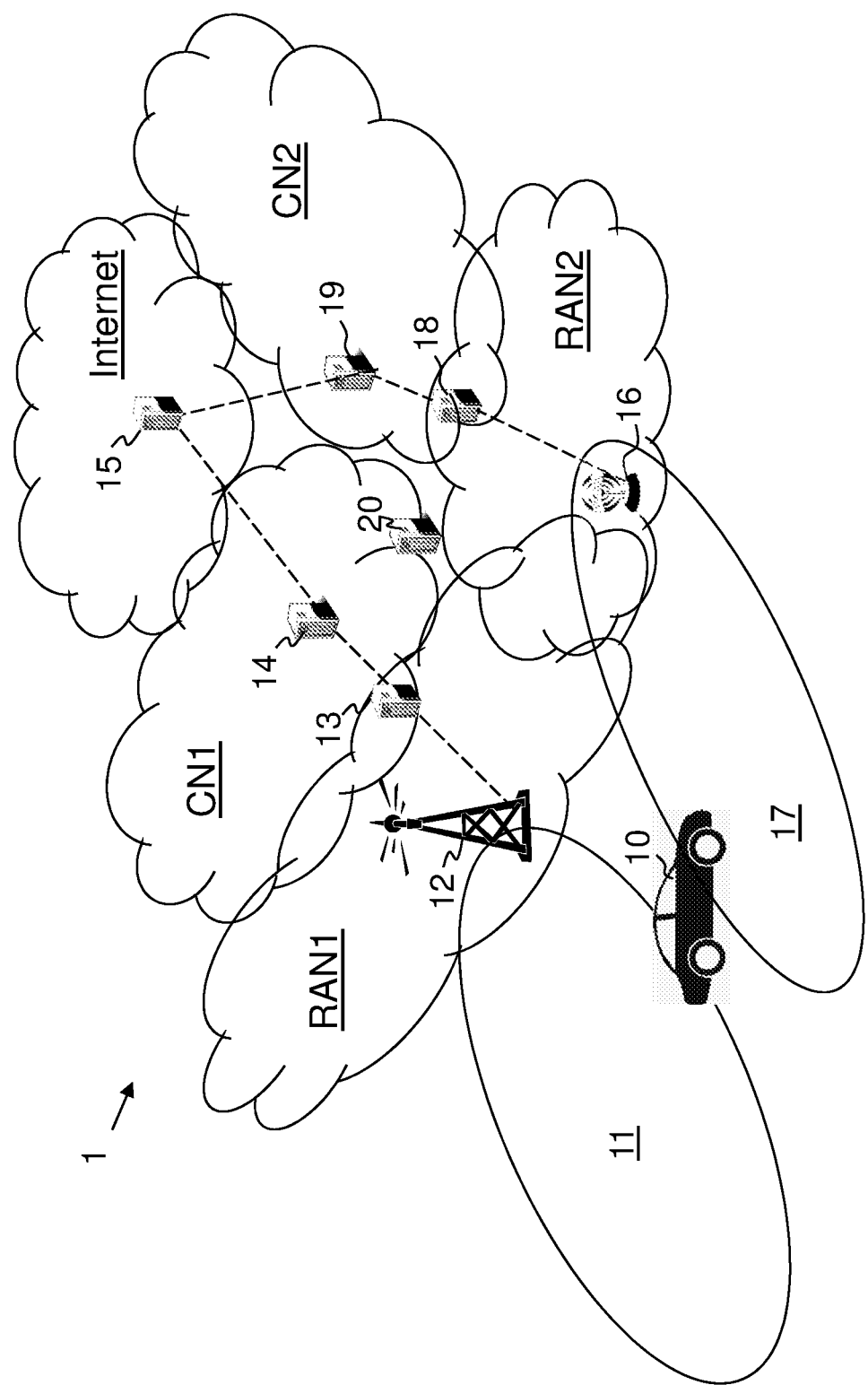
FIG. 1 is a schematic overview depicting a communication network according to embodiments herein.

Embodiments herein relate to communication networks in general. FIG. 1 is a schematic overview depicting a communication network 1. The communication network 1 comprises one or more RANs and one or more CNs. The communication network 1 may use a number of different technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. WCDMA and LTE.

In the communication network 1, wireless devices e.g. a wireless device 10 such as a mobile station, a non-access point (non-AP) STA, a STA, a user equipment and/or a wireless terminal, communicate via one or more Access Networks (AN), e.g. first RAN (RAN1) and a second RAN (RAN2), to one or more CNs such as a first core network (CN1) and a second core network (CN2). It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a base station communicating within a cell.

The communication network 1 comprises a first radio access node 12 providing radio coverage over a geographical area, a first service area 11, of a first radio access technology (RAT), such as LTE, UMTS, Wi-Fi or similar. The first radio access node 12 may be a radio access network (RAN) node such as radio network controller or an access point such as a Wireless Local Area Network (WLAN) access point (AP), a WiFi AP or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of serving a wireless device within the service area served by the first radio access node 12 depending e.g. on the first radio access technology and terminology used.

Furthermore, the communication network 1 comprises a first gateway 13, such as a serving Gateway (S-GW) or a Packet Data Network Gateway (P-GW), to the CN1 and the CN1 comprises a first core network node 14 such as a router or similar. The first gateway 13 may be referred to as a first IP PoP node. The wireless device 10 is communicating with a communication network node 15 such as an internet server, a function/application server or similar.

The wireless device 10 may then change/move to be served by a second radio access node 16. The second radio access node 16 provides radio coverage over a geographical area, a second service area 17, of a second RAT, such as WiFi, LTE, UMTS or similar. The second radio access node 16 may be a radio access network node such as radio network controller or an access point such as a WLAN access point, a WiFi AP, or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of serving a wireless device within the service area served by the second radio access node 16 depending e.g. on the second radio access technology and terminology used. The first and second RATs may be the same RAT or different RATs.

Furthermore, the communication network 1 comprises a second gateway 18 such as an S-GW or a P-GW to the CN2 and the CN2 comprises a second core network node 19 such as a router or similar. The second gateway 18 may be referred to as a second IP PoP node. The communication network 1 also comprises an Operation and Support System, OSS, node 20 managing operation of the communication network 1 and the network nodes in the communication network 1.

Figure 2:
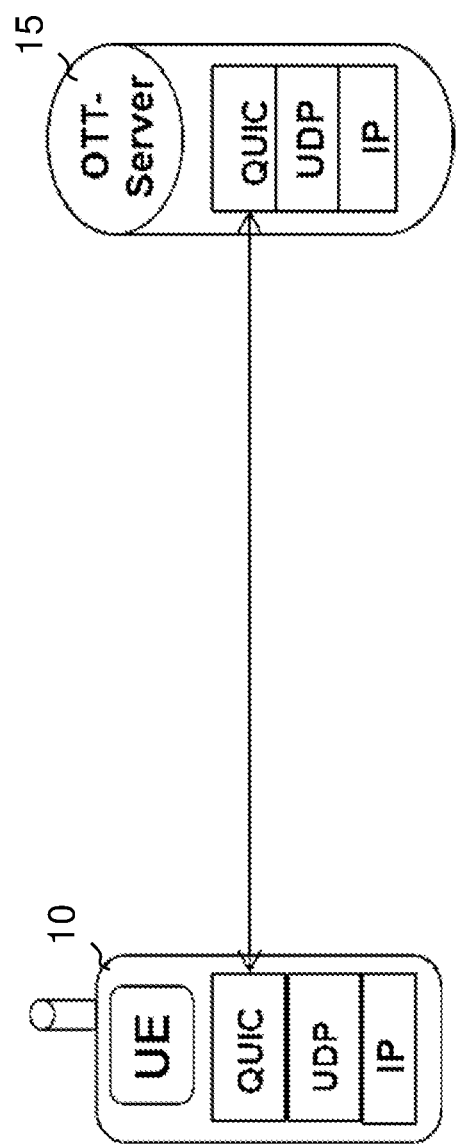
FIG. 2 is a schematic overview of protocol stacks of communication using Quick UDP Internet Connections (QUIC) protocol.

According to embodiments herein packets are routed to and/or from the wireless device 10 via the second gateway 18 instead of the first gateway 13 and thereby the packets are routed more efficiently through the communication network 1 as e.g. the second gateway 18 is closer to the wireless device 10 than the first gateway 13. In order to perform the change of routing path according to embodiments herein the OSS node 20 firstly identifies one or more sessions that allows for session continuity even though the source and/or destination IP address changes in the packets of the one or more sessions. E.g. the OSS node 20 may inspect packets to determine that the session of packets are associated to a Quick UDP Internet Connections (QUIC) flow, see FIG. 2 below. The source and/or destination IP address of the packets of the identified one or more sessions are then changed in an IP PoP node, such as the first GW 13 or the second GW 18, or in another network node, e.g. the second radio access node 16, closer to the wireless device 10 than the IP PoP node. It should here be noted that the network node may be any of the first gateway 13, the first core network node 14, the second radio access node 16, the second gateway 18, or the second core network node 19. The communication network node 15 and/or the wireless device 10 may see or detect that the source IP address has changed for the incoming packets of the session. The communication network node 15 and/or the wireless device 10 may then send IP packets back to the changed source IP address for this session. By this simple change of source IP address, a new route is established for the IP packets belonging to the one or more sessions without having endpoints or the integrated network to implement any specific IP mobility management solution. Changing IP address can be done by a NAT functionality of the GW that currently is the IP PoP of the wireless device 10 or in a network node closer to the wireless device 10 than the IP PoP node. The change of gateway may be needed during an handover, but may also be done at a later point in time, e.g. due to traffic load conditions, or without an handover and only due to load balancing between GWs. Embodiments herein thus enable a seamless, i.e. with session continuity, on-demand traffic steering with low effort, as it does not require IP mobility management solution such as Mobile IP.

As stated above the OSS node 20 identifies the one or more sessions to allow for session continuity even though the source and/or destination IP address changes e.g. by determining that the one or more sessions of packets are associated to a Quick UDP Internet Connections (QUIC) flow. QUIC is a User Datagram Protocol (UDP) based protocol, which has built in security corresponding to TLS over TCP. QUIC runs on top of UDP and on top of IP, see protocol stacks in FIG. 2, e.g. between the wireless device 10 also referred to as a UE and the communication network node 15 such as an application server e.g. an over the top (OTT) server. One of the main reasons for QUIC is to optimize the session establishment for a secure connection. In TCP/TLS several Round Trip Times (RTT) are consumed to establish the connection while for QUIC the RTT can be zero. This is possible by storing a security token as a cookie in a browser. QUIC separates the security state of the session from UDP port and IP-addresses, still the design allows for NAT and firewall traversal. The QUIC allows for the IP address and ports to change during an ongoing session and still the session can continue without having to be re-established which is the case for current solution with TLS over TCP. Hence, the QUIC protocol, currently a default transport protocol used in e.g. a Chrome browser, is increasing in usage over the internet and allows for session continuity even though an IP address changes for the wireless device 10. Hence, in some embodiments herein the OSS node 20 may identify the session as a QUIC session and thereby identify that the session is run over a protocol that supports continuity even though source or destination IP addresses change in the packets. For example, the OSS node 20 may check for a QUIC indication in the header of the packet for identifying the session of the packet as a QUIC protocol session.

Figure 3:
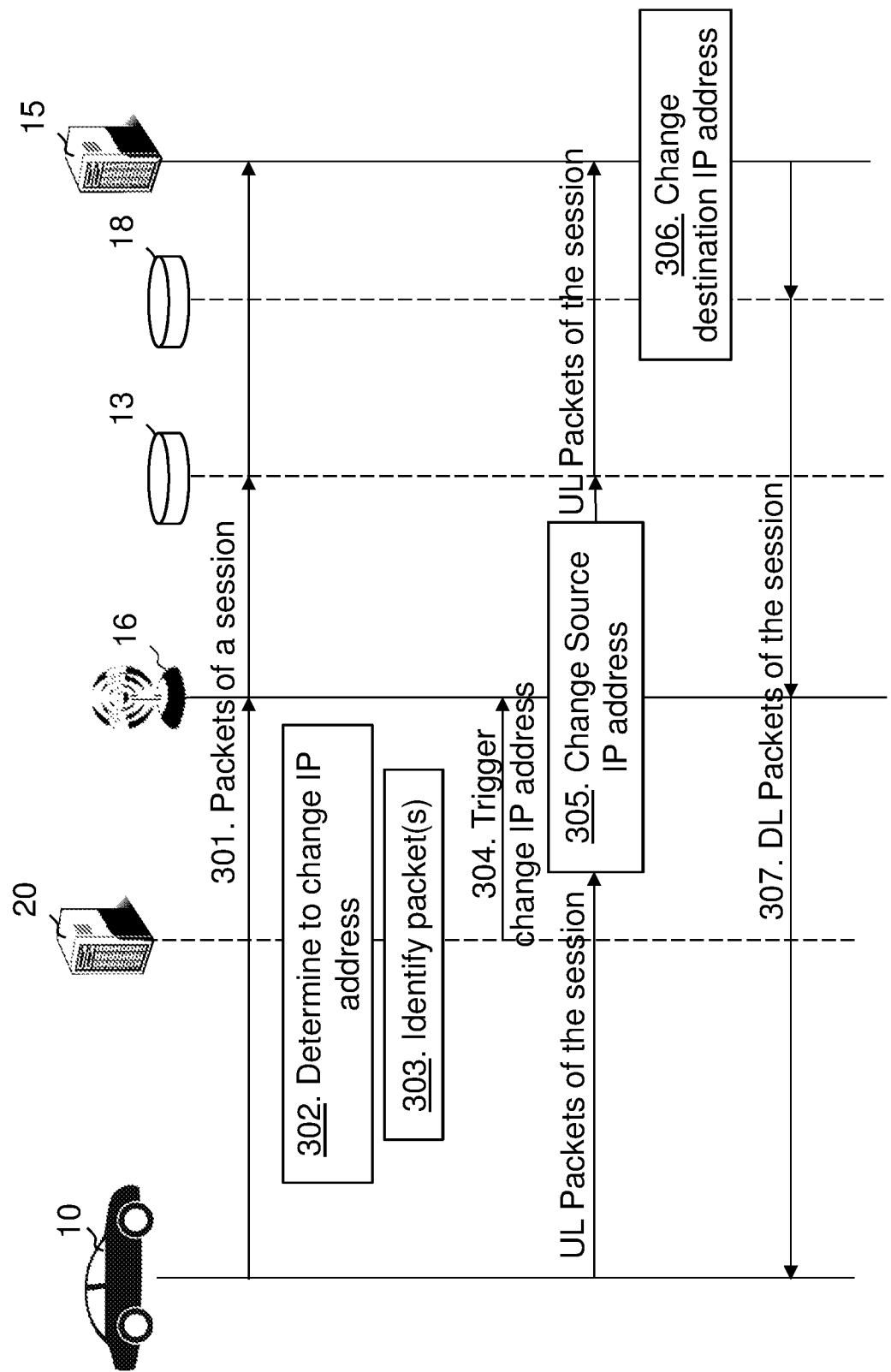
FIG. 3 is a combined flowchart and signalling scheme according to embodiments herein.

FIG. 3 is a combined flowchart and signalling scheme depicting handling or maintaining communication of packets according to embodiments herein.

Action 301. Packets of a session are transmitted through the communication network 1 to the communication network node 15. In the example, the wireless device 10 moves to the second service area 17 and packets are transmitted via the second radio access node 16 and then via the first GW 13 which is the first IP PoP of the wireless device 10.

Action 302. The OSS node 20 may determine to implement a change of the IP address. This may be the case when a handover is triggered, a load balancing is needed between RAN nodes or GWs, or similar. E.g. measurements tools in a network optimization function in the OSS node 20 may generate an action to steer traffic of the session to another access node, i.e. to the second GW 18, due to a non-optimal routing caused by the fact that the wireless device 10 has moved/being served by a different RAN. Thus, the shortest route, with least hops or fastest, is not used due to that the wireless device's IP address is not part of the best IP PoP addressing space. Two parameters per session packet flow may be derived in the network optimization tool: a) Current wireless device's IP address of the session and b) selecting a new IP address of a set of addresses at the second gateway 18. This set of address are associated with the second gateway 18.

Action 303. The OSS node 20 identifies the session being a session that allows session continuity even though the IP address changes, e.g. source and/or destination IP address. A Quick UDP Internet Connections (QUIC) protocol allows for session continuity even though IP addresses change. Thus, the OSS node 20 may check for a QUIC indication in a header of the packet for identifying the packet of the session as a packet that allow session continuity even though an IP address changes.

Action 304. The OSS node 20 then triggers a change of the source IP address of packets in such an identified session, passing by an IP PoP node such as the first GW 13. The change may be triggered by sending a trigger indication to the second radio access node 16 indicating an initiation of IP address change of packets of the session. Hence, when the OSS node 20 detects a session that allows IP address change, the OSS node 20 initiates an IP address change of packets of the identified session.

Action 305. The second radio access node 16 then changes the source IP address of the packets of the identified session. The change may be done in the IP PoP node e.g. the first GW 13 or in a network node closer to the wireless device 10 than the first GW 13 such as illustrated in the second radio access node 16. These packets are still then forwarded via the first GW 13 to the communication network node 15 but with a changed source IP address. Changing IP address can be done by a NAT functionality of the second radio access node 16 or the first GW 13.

Action 306. The communication network node 15 will then detect that the source IP address has changed for the incoming packets of the session, and determine a new destination IP address for packets in the session back to the wireless device 10.

Action 307. The Communication network node 15 will then send IP packets back to the new source IP address for this session, now being the destination IP address of the packets. Thus, an end-point such as the communication network node 15 will detect that the packets are delivered with a new IP address and believe that a NAT have changed its translation state. The communication network node 15 changes the session to using the new destination IP address, i.e. the source as the destination address, and optimal routing is achieved. By this simple source IP address change a new route is established for the IP packets belonging to the session without having the endpoints or the integrated network to implement any specific IP mobility management solution.

Figure 4:
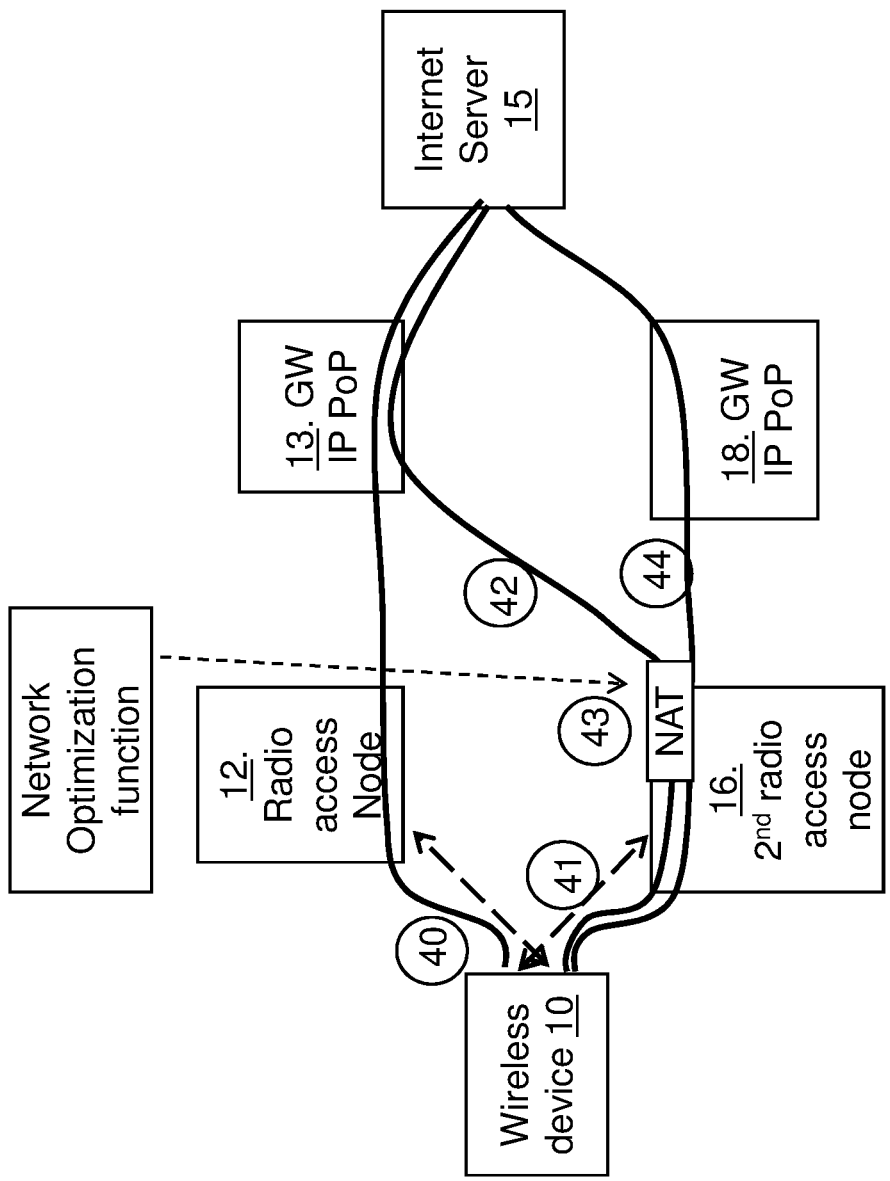
FIG. 4 is a schematic overview depicting a communication network according to embodiments herein.

FIG. 4 is a schematic overview depicting the communication network 1 according to embodiments herein for UL packets. In this embodiment the NAT functionality is performed by a network node closer to the wireless device 10 than the wireless device's IP PoP. This first sequence diagram describes the case when both endpoints, i.e. the wireless device 10 and the communication network node 15, support an IP address change. Hence, the NAT functionality may need to be invoked only one time which is the time of the traffic steering action.

Action 40. The wireless device 10 transmits packets that are routed according to routing for an ongoing QUIC session.

Action 41. The wireless device 10 moves to the second radio access node 16 and a handover process of the wireless device to the new access node i.e. the second radio access node 16 is performed.

Action 42. The packets of the QUIC session are routed to the first GW 13 after handover but with the original IP-address. This leads to a non efficient routing of the packets.

Action 43. A network optimization function of the OSS node 20 triggers an uplink IP address change by a NAT to a new IP-address. Thus the IP address change is triggered by the OSS node 20. Only uplink packets change IP-addresses.

Action 44. The communication network node 15 such as an Internet server discovers the new IP-address of the received packets and use the new IP-address, the changed IP address, for sending the traffic downlink to the second GW 18. Thus, a new "optimal" routing path is established and used.

Figure 5:
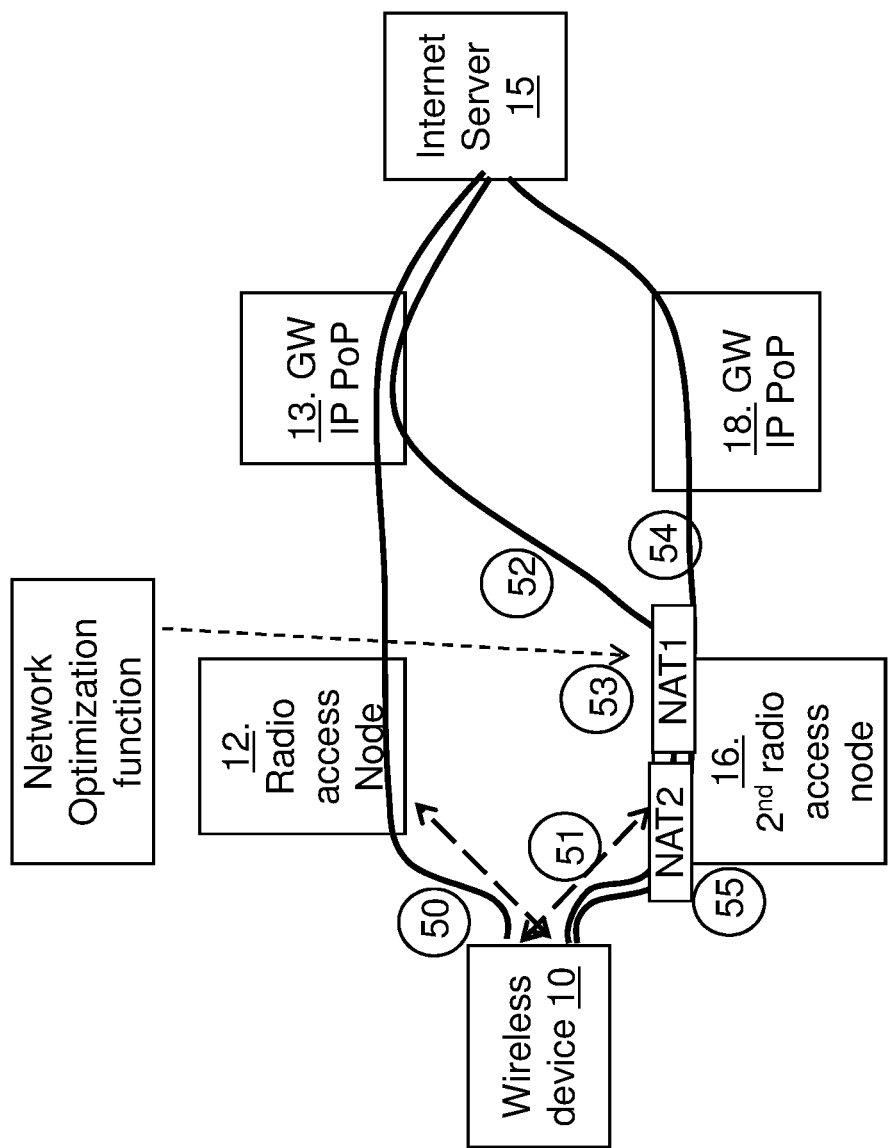
FIG. 5 is a schematic overview depicting a communication network according to embodiments herein.

FIG. 5 is a schematic overview depicting the communication network according to embodiments herein for UL and DL packets. This second sequence diagram describes the case when the IP address of the wireless device 10 is to be kept the same e.g. when load balancing GWs. Hence, the NAT functionality is invoked every time to change/translate the IP address of the wireless device 10 known by the communication network node 15 e.g. internet server.

Action 50. The wireless device 10 transmits packets that are routed according to routing for an ongoing QUIC session.

Action 51. The wireless device 10 moves to the second radio access node 16 and a handover process of the wireless device to the new access node i.e. the second radio access node 16 is performed.

Action 52. The packets of the QUIC session are routed to the first GW 13 after handover but with old IP-address. This leads to a non efficient routing of the packets.

Action 53. A network optimization function of the OSS node 20 triggers an uplink IP address change by a NAT to a new IP-address. Thus the IP change is triggered by the OSS node 20. A first NAT, NAT1, is initiated in the second radio access node 16, which NAT1 translates sources IP addresses in UL packets to changed IP addresses of the second GW 18.

Action 54. The communication network node 15 discovers the changed IP-address and use the changed IP-address for routing packet back to the wireless device 10, e.g. setting the changed source IP address as a destination address of packets. A new "optimal" routing path is established and used.

Action 55. The network optimization function of the OSS node 20 may further trigger a second NAT2 that changes destination IP address of DL packets back to the original IP address of the wireless device 10. Thus, both uplink and downlink packets may change IP-addresses, e.g. source IP address in UL packets and destination IP address in DL packets.

Figure 6:
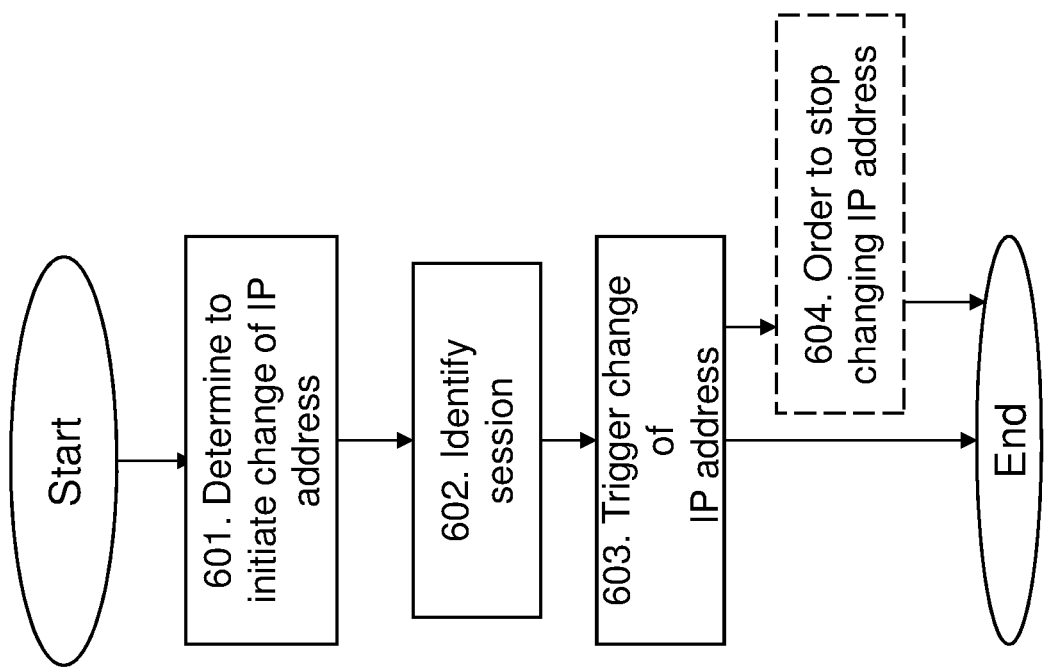
FIG. 6 is a flowchart depicting a method performed by an OSS node according to embodiments herein.

The method actions performed by the OSS node 20 for handling communication between the wireless device 10 and the communication network node 15 in the communication network 1 according to some embodiments will now be described with reference to a flowchart depicted in FIG. 6. The actions do not have to be taken in the order stated below, but may be taken in any suitable order. Actions performed in some embodiments are marked with dashed boxes. The communication network 1 comprises the first radio access node 12 associated with the first gateway 13 and the second radio access node 16 associated with the second gateway 18. The OSS node 20 may be a stand-alone node or a co-located node with a gateway or similar.

Action 601. The OSS node 20 determines to initiate the change of the IP address for the wireless device 10. The OSS node 20 may determine to initiate the change of the IP address for the wireless device 10 when determining that the wireless device 10 is handed over, e.g. roams, from the first radio access node 12 to the second radio access node 16. The OSS node 20 may determine to initiate the change of the IP address based on an optimization process for routing packets in the communication network 1, e.g. load balancing between the GWs. Hence, embodiments herein also apply in situations where the IP change is initiated all the time after a change of GW or IP PoP, e.g. in cases when the wireless device 10 does not actually change the IP address but in the communication with the server it looks that the wireless device 10 has changed IP address.

Action 602. The OSS node 20 identifies the session of packets for the wireless device 10, which session is run over a protocol that supports session continuity even though source or destination IP addresses change in one or more packets. The OSS node 20 may identify the session by detecting that the session is run over e.g. the QUIC protocol or other UDP based protocols.

Action 603. The OSS node 20 triggers the change of the IP address associated with the first gateway 13 for the wireless device 10, of packets of the session, to a changed IP address associated with the second gateway 18. For example, the OSS node 20 may transmit a request to the network node such as the first gateway 13, the first core network node 14, the second radio access node 16, the second gateway 18, or the second core network node 19. The request is requesting the network node to initiate the change of the IP address for the wireless device 10. The change may be a NAT comprising changing a source IP address, associated with the first gateway, of packets of the session for the wireless device 10, to a changed source IP address, associated with the second gateway. The OSS node 20 may obtain an IP address of the wireless device 10 and may select a new IP address associated with the second GW 18 i.e. the new IP PoP. Additionally or alternatively, the change may be a NAT comprising changing a destination IP address, associated with the first gateway, of packets of the session for the wireless device 10, to a changed destination IP address associated with the second gateway. Thus, the OSS node 20 may invoke a NAT functionality of the network node of a route of the session for changing the source IP address and/or destination IP address. The change may e.g. be to change the source IP address of UL packets of the session to the selected new IP address such that any of the end-points, i.e. the communication network node, detects that the session packet flow has had a change in IP address.

The OSS node 20 may trigger the change of IP address by further transmitting an additional request to another network node, e.g. the second radio access node 16, or the same network node. This may be implemented when e.g. the wireless device 10 that is the receiver of the session packets in DL from the communication network node 15 was not assigned a new IP address due to a traffic steering action e.g. load balancing, a second NAT will translate back the destination IP address to the IP address used by the wireless device 10. The additional request is requesting the other/same network node to initiate a second change, e.g. the second GW 18 or the second radio access node 16, of packets of the session from the changed IP address associated with the second gateway to the IP address associated with the first gateway for the wireless device 10, e.g. by implementing a second NAT function. The second change may comprise changing a changed source IP address and/or a changed destination IP address, associated with the second gateway, of packets of the session for the wireless device 10, to a source IP address and/or changed destination IP address associated with the first gateway. Thus, the OSS node 20 may invoke a second NAT functionality of one network node of the route of the session for changing the source IP address and/or destination IP address. The second NAT functionality is to change the new destination address back to the old destination address of the session for downlink packets in the session's packet flow, including a sub step of performing the destination address change. The second NAT functionality may in addition or alternatively change the source IP address of downlink packets of the session, to the set of outgoing IP address of e.g. the second gateway 18, i.e. the new IP PoP Action 604. The OSS node 20 may order the network node to stop changing the IP address e.g. by sending an interrupt indication to the network node and/or the other network node.

Figure 7:
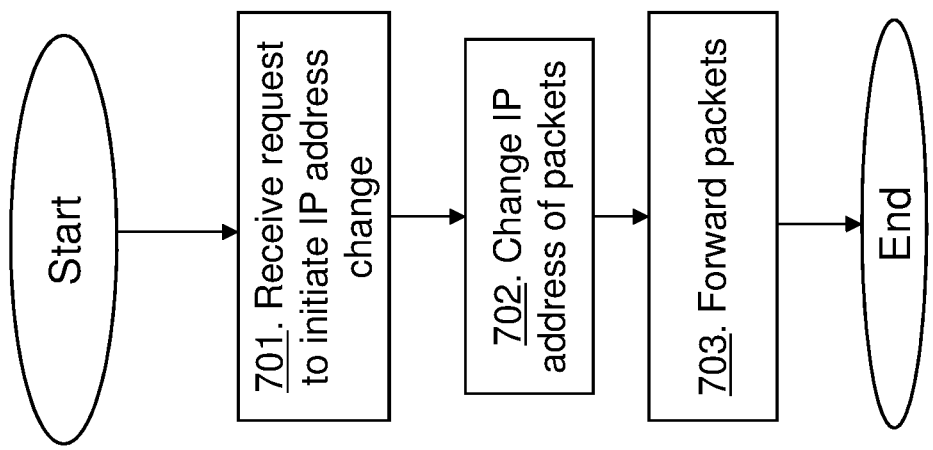
FIG. 7 is a flowchart depicting a method performed by a network node according to embodiments herein.

The method actions performed by the network node, e.g. the $2^{nd}$ radio network node 16 or the second gateway 18, for handling communication between the wireless device 10 and the communication network node such as the Internet server 15 in the communication network 1 according to some embodiments will now be described with reference to a flowchart depicted in FIG. 7. The actions do not have to be taken in the order stated below, but may be taken in any suitable order. The communication network 1 comprises the first radio access node 12 associated with the first gateway 13 and the second radio access node 16 associated with the second gateway 18. The network node may be associated with the second gateway 18 such as being the second radio access node 16, the second gateway 18 or second core network node 18; or the network node may be associated with the first gateway 18, such as being the first gateway 13, or the first core network node 14. In its simplest for the network node is just an implementation of a NAT in the routing path of the packets of the session.

Action 701. The network node receives the request from the OSS node 20. The request is requesting the network node to initiate the change of the IP address associated with the first gateway 13 or the second gateway 18 for the wireless device 10, of packets of the session for the wireless device 10, to a changed IP address associated with the second gateway or the first gateway.

Action 702. The network node further changes the IP address associated with the first gateway 13 or the second gateway 18 for the wireless device 10, of one or more packets of the session to the changed IP address associated with the second gateway or the first gateway. The session is run over a protocol that supports session continuity even though source or destination IP addresses change in the one or more packets. The changing may be implemented by a NAT function mapping the changed IP address associated with the second gateway 18 to the IP address associated with the first gateway 13, e.g. to be used on UL packets NAT1. Alternatively or additionally, the NAT function may map the changed IP address associated with the first gateway 13 to the IP address associated with the second gateway 18, e.g. to be used on DL packets NAT2. The network node may change the IP address of packets until receiving a packet with the changed IP address for the wireless device 10, until no packets from the wireless device 10 is received during a time interval, or until receiving an interrupt indication from the OSS node 20 indicating to stop changing the IP address associated with the first gateway for the wireless device. The network node may change the IP address by changing the source IP address, in case of UL packets, and/or the destination IP address, in case of DL packets, associated with the first gateway 13, of packets of the session for the wireless device 10, to a changed source IP address and/or changed destination IP address associated with the second gateway 18. The network node may change the IP address, e.g. when the wireless device 10 does not change IP address but merely is moved due to load balancing, by changing the changed source IP address and/or the changed destination IP address, associated with the second gateway, of packets of the session for the wireless device 10, to the source IP address and/or changed destination IP address associated with the first gateway 13. E.g. if NAT is in the second radio access node 16, the second radio access node 16 may realize when the wireless device 10 has changed to the new IP address and by this decides to remove the NAT. During a time period when NAT is allocated there is a link from the second radio access node 16 to the network node that has the NAT. In a mobile system it may be a L2 GPRS Tunneling Protocol (GTP) tunnel to the first GW 13. But if NAT is not in the second radio access node 16 then the network node is no longer part of the communication chain after that the new IP address is used, so in that case the network node performing the changing of IP addresses may disconnect the NAT using a timer or if a dedicated protocol is used e.g. a "NAT disconnect" message, sent to the network node, see action 604 above.

Action 703. The network node forwards the one or more packets of the session towards the communication network node or the wireless device 10. The receiving network node, e.g. the communication network node or the wireless device 10, then discovers the changed source IP address of the incoming session packet, and uses the said source IP address as the new destination address in the outgoing packets of the session packet flow.

The NAT may only be used as long as the wireless device 10 keeps the old or original IP address, received from the first GW 13. In case the wireless device 10 changes the IP address, e.g. if the wireless device 10 is forced to do a re-attach procedure or if a new IP reallocation procedure is introduced to force the wireless device 10 to change IP address, the changed IP address is pointing at the second GW 18 instead and the NAT in RAN1/CN1 is not needed anymore. However, as mentioned above, the wireless device 10 may keep the original IP address, and in some embodiments the wireless device 10 may keep the old IP address and at a later stage, or direct as part of the load balancing, the wireless device 10 is forced to change IP address and when that is done this temporary NAT is removed for traffic of the wireless device 10. Hence, the packet flow of the session is directed to the second GW 18 and then the IP address of the wireless device 10 is changed. These action may be performed as an automated sequence or by management actions when to initiate the different actions.

Figure 8:
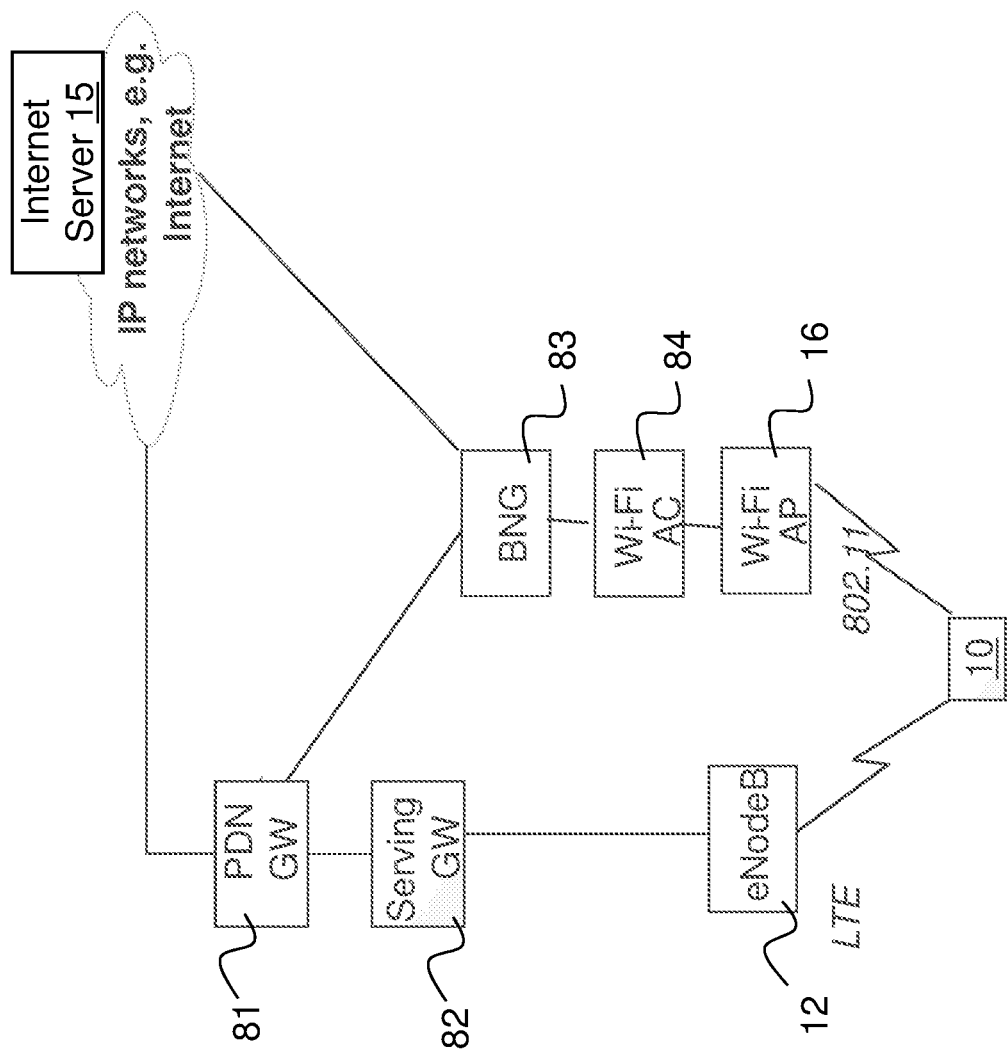
FIG. 8 is a schematic overview depicting a communication network according to embodiments herein.

The embodiment herein are at least applicable both in the backbone network between access network gateways, and in 3GPP WiFi integrated networks. FIG. 8 is a schematic overview depicting one further specific embodiment where embodiments are applicable in the existing network architecture of 3GPP and WiFi integration as specified in 3GPP TS 23.402. In this embodiment the wireless device 10 has one IP connection towards Internet via a Packet Data Network Gateway (PDN GW) 81 connected to the first radio access node 12, eNB, via a serving gateway (S-GW) 82, with IP address of the wireless device denoted as IP_3gpp, and another IP connection, with IP address of the wireless device denoted as IP_wifi, via a Boarder Network Gateway (BNG) 83 connected to the second radio access node 16, WiFi AP, via a WiFi Access Controller (AC) 84. Traffic steering between LTE and WiFi may be performed by traffic steering from LTE to WiFi in the OSS node 20 (not shown) with the following steps:

A) A traffic steering control unit in the OSS node 20 instructs a NAT functionality in e.g. the PDN GW 82 to change the source IP address, IP_3gpp, of the uplink IP packets to the IP-address of the wireless device 10 assigned for WiFi, IP_wifi.

B) The communication network node 15, exemplified as an Internet server, discovers that the source IP address has changed for this session.

C) When the communication network node 15 is to send data within this session, it will send to the source IP address of the uplink packets, which is now IP_wifi.

D) The downlink IP packets will now be routed to the BNG 83 and onwards to the wireless device 10 via WiFi network.

This straightforward traffic steering scheme is seamlessly applicable to sessions using e.g. the QUIC protocol as the session is identified by a 64 bits connection id randomly selected by the client instead of the traditional 5-tuple, source and destination IP addresses along with port numbers and transport protocol identifier.

Figure 9:
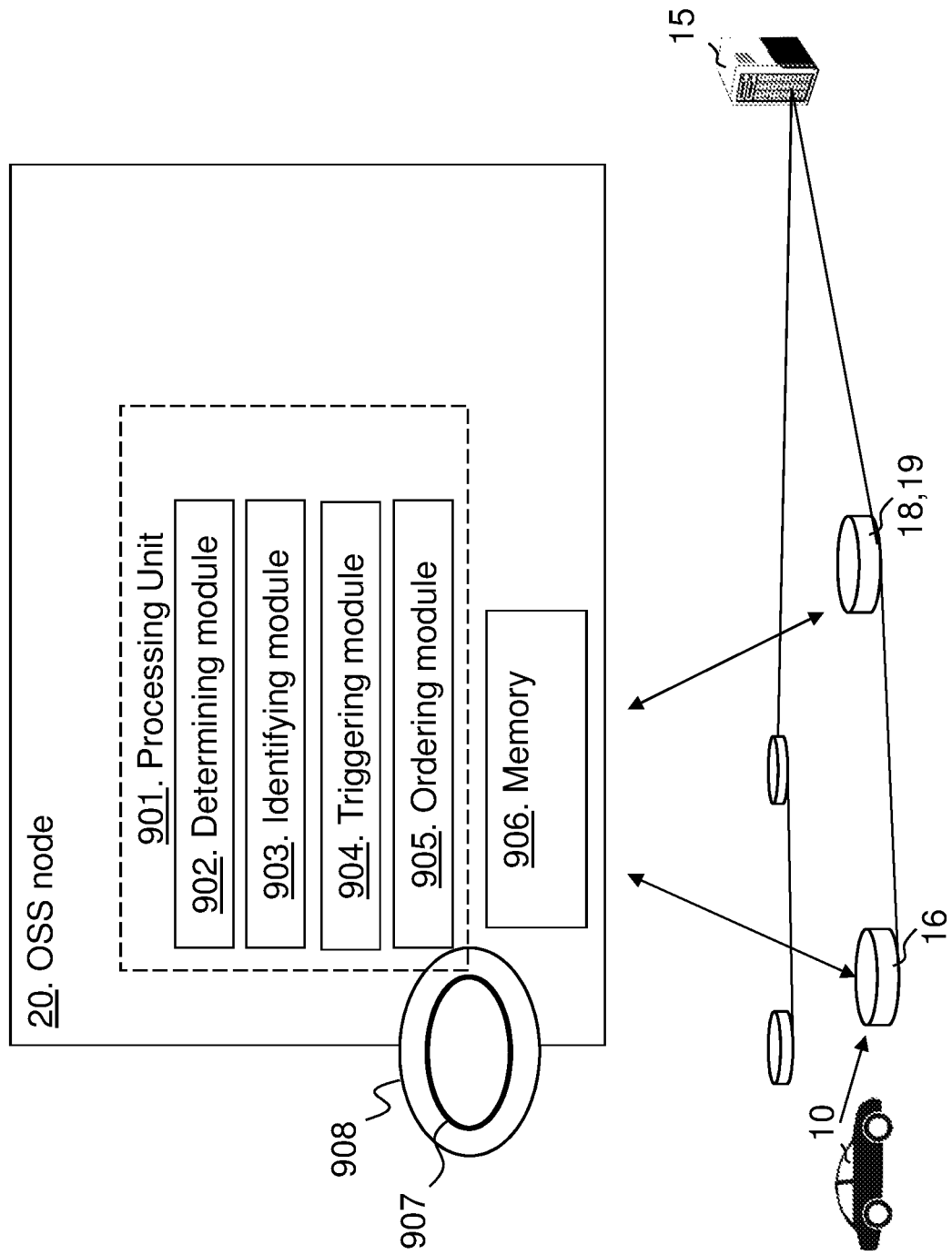
FIG. 9 is a block diagram depicting an OSS node according to embodiments herein.

FIG. 9 is a block diagram depicting the OSS node 20 for handling communication between the wireless device 10 and the communication network node 15 in the communication network 1. The communication network 1 comprises the first radio access node 12 associated with the first gateway 13 and the second radio access node 16 associated with the second gateway 18. The OSS node 20 may comprise a processing unit 901, e.g. one or more processors, configured to perform the methods herein.

The OSS node 20 is configured to determine to initiate the change of the IP address for the wireless device 10. The OSS node may comprise a determining module 902. The processing unit 901 and/or the determining module 902 may be configured to determine to initiate the change of the IP address for the wireless device 10. The OSS node 20 may be configured to determine to initiate the change of the IP address by being configured to determine that the wireless device 10 is handed over from the first radio access node 12 to the second radio access node 16. The processing unit 901 and/or the determining module 902 may be configured to determine to initiate the change of the IP address by being configured to determine that the wireless device 10 is handed over from the first radio access node 12 to the second radio access node 16. The OSS node 20 may be configured to determine to initiate the change of the IP address by being configured to determine to initiate the change of the IP address based on an optimization process, e.g. load balancing between the GWs, for routing packets in the communication network 1. The processing unit 901 and/or the determining module 902 may be configured to determine to initiate the change of the IP address by being configured to determine to initiate the change of the IP address based on the optimization process for routing packets in the communication network 1.

The OSS node 20 is configured to identify the session of packets for the wireless device 10, which session is run over the protocol that supports session continuity even though source or destination IP addresses change in the packets. The OSS node may comprise an identifying module 903. The processing unit 901 and/or the identifying module 903 may be configured to identify the session of packets for the wireless device 10, which session is run over the protocol that supports session continuity even though source or destination IP addresses change in the packets. The OSS node 20 may be configured to identify the session of packets by being configured to detect that the session is run over the QUIC protocol. The processing unit 901 and/or the identifying module 903 may be configured to identify the session of packets by being configured to detect that the session is run over the QUIC protocol.

The OSS node 20 is configured to trigger the change of the IP address associated with the first gateway for the wireless device 10, of packets of the session, to the changed IP address associated with the second gateway. The OSS node may comprise a triggering module 904. The processing unit 901 and/or the triggering module 904 may be configured to trigger the change of the IP address associated with the first gateway 13 for the wireless device 10, of packets of the session, to the changed IP address associated with the second gateway 18. The OSS node 20 may be configured to trigger the change of the IP address by being configured to transmit the request to the network node 100 in the communication network, which request is requesting the network node to initiate the change of the IP address, NAT1, for the wireless device 10. The processing unit 901 and/or the triggering module 904 may be configured to trigger the change of the IP address by being configured to transmit the request to the network node 100 in the communication network. The change may comprise changing the source IP address and/or the destination IP address, associated with the first gateway 13, of packets of the session for the wireless device 10, to the changed source IP address and/or changed destination IP address associated with the second gateway 18. The OSS node 20 may be configured to trigger the change of the IP address by being configured to transmit the additional request to another or same network node, which additional request is requesting the other or same network node to initiate the second change, NAT2, of packets of the session from the changed IP address associated with the second gateway 18 to the IP address associated with the first gateway 13 for the wireless device 10. The processing unit 901 and/or the triggering module 904 may be configured to trigger the change of the IP address by being configured to transmit the additional request to another or same network node, which additional request is requesting the other or same network node to initiate the second change of packets of the session from the changed IP address associated with the second gateway 18 to the IP address associated with the first gateway 13 for the wireless device 10. The second change may comprise changing the changed source IP address and/or the changed destination IP address, associated with the second gateway 18, of packets of the session for the wireless device 10, to the source IP address and/or the destination IP address associated with the first gateway 13.

The OSS node 20 is further be configured to order the network node to stop changing the IP address with an interrupt indication. The OSS node 20 may comprise an ordering module 905. The processing unit 901 and/or the ordering module 905 may be configured to order the network node to stop changing the IP address with the interrupt indication.

The OSS node 20 further comprises a memory 906. The memory comprises one or more units to be used to store data on, such as IP addresses of wireless devices and network nodes, routing information, session information, packet information, NATs, applications to perform the methods disclosed herein when being executed, and/or similar.

The methods according to the embodiments described herein for the OSS node 20 are respectively implemented by means of e.g. a computer program 907 or a computer program product, comprising instructions, i.e., software code portions, which, when executed on at least one processor, cause the at least one processor to carry out the actions described herein, as performed by the OSS node 20. The computer program 907 may be stored on a computer-readable storage medium 908, e.g. a disc or similar. The computer-readable storage medium 908, having stored thereon the computer program, may comprise the instructions which, when executed on at least one processor, cause the at least one processor to carry out the actions described herein, as performed by the OSS node 20. In some embodiments, the computer-readable storage medium may be a non-transitory computer-readable storage medium.

Figure 10:
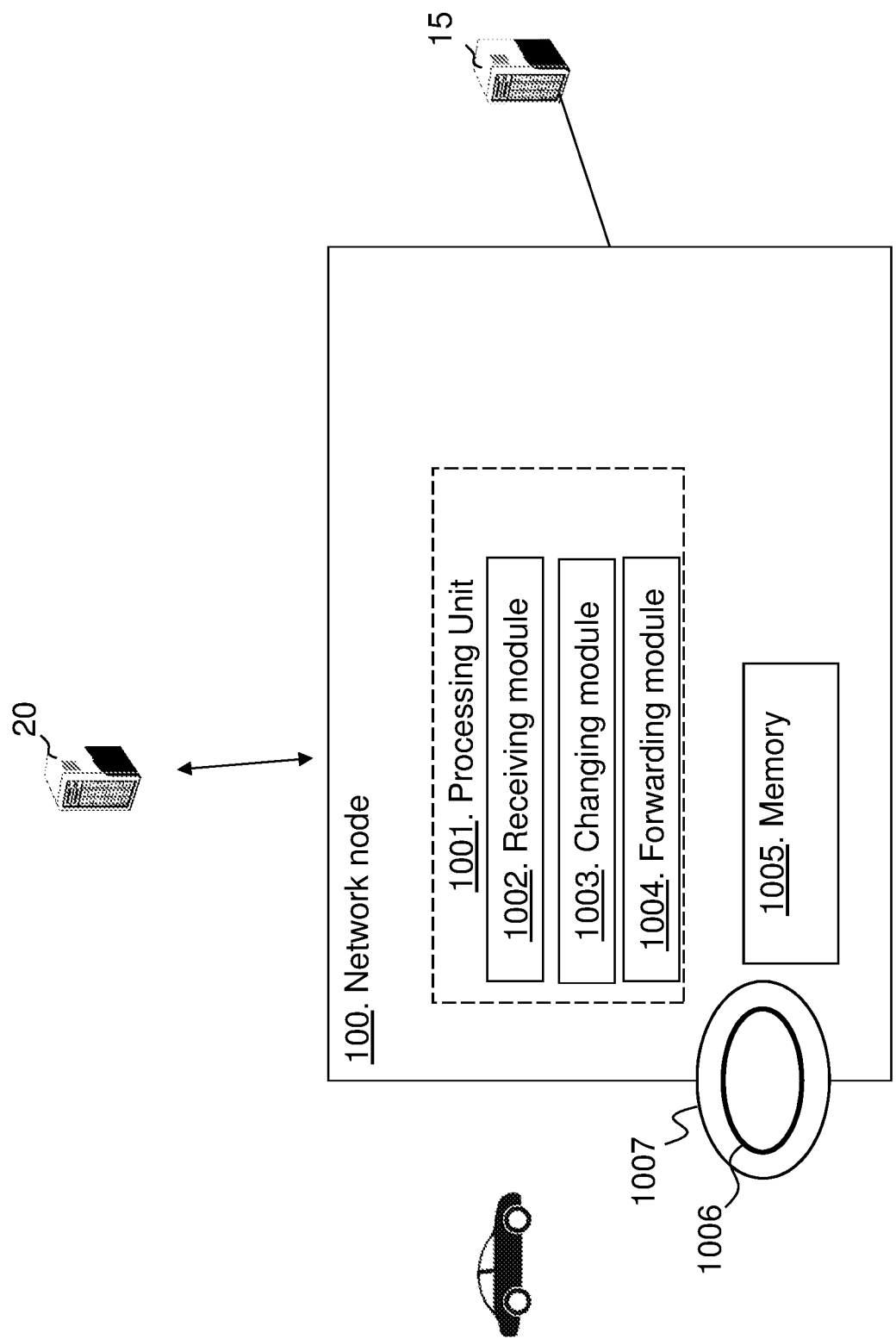
FIG. 10 is a block diagram depicting a network node according to embodiments herein.

FIG. 10 is block diagram depicting the network node 100 for handling communication between the wireless device 10 and the communication network node 15 in the communication network 1. The communication network 1 comprises the first radio access node 12 associated with the first gateway 13 and the second radio access node 16 associated with the second gateway 18. The network node 100 may comprise a processing unit 1001, such as one or more processors, configured to perform the methods herein.

The network node 100 is configured to receive the request from the OSS node 20, which request is requesting the network node to initiate the change of the IP address associated with the first gateway 13, e.g. NAT1 above, or the second gateway 18, e.g. NAT2 above, for the wireless device 10, of packets of the session for the wireless device 10, to the changed IP address associated with the second gateway or the first gateway. The network node 100 may comprise a receiving module 1002. The processing unit 1001 and/or the receiving module 1002 may be configured to receive the request from the OSS node 20.

The network node 100 is configured to change the IP address associated with the first gateway 13 or the second gateway 18 for the wireless device 10, of one or more packets of the session to the changed IP address associated with the second gateway 18 or the first gateway 13. The session is run over a protocol that supports session continuity even though source or destination IP addresses change in the one or more packets. The network node 100 may comprise a changing module 1003. The processing unit 1001 and/or the changing module 1003 may be configured to change the IP address associated with the first gateway 13 or the second gateway 18 for the wireless device 10, of one or more packets of the session to the changed IP address associated with the second gateway 18 or the first gateway 13. The network node 100 may be configured to change the IP address by being configured to implement the NAT function mapping the changed IP address associated with the second gateway or the first gateway to the IP address associated with the first gateway or the second gateway. The processing unit 1001 and/or the changing module 1003 may be configured to change the IP address by being configured to implement the NAT function mapping the changed IP address associated with the second gateway or the first gateway to the IP address associated with the first gateway or the second gateway. The network node 100 may be configured to change the IP address of packets of the session: until receiving a packet with the changed IP address for the wireless device 10; until no packets from the wireless device is received during a time interval; or until receiving an interrupt indication from the OSS node 20 indicating to stop changing the IP address associated with the first gateway for the wireless device 10. The processing unit 1001 and/or the changing module 1003 may be configured to change the IP address of packets of the session: until receiving a packet with the changed IP address for the wireless device 10; until no packets from the wireless device is received during a time interval; or until receiving an interrupt indication from the OSS node 20 indicating to stop changing the IP address associated with the first gateway for the wireless device 10. The network node 100 may be configured to change the IP address by being configured to change the source IP address and/or the destination IP address, associated with the first gateway, of packets of the session for the wireless device 10, to the changed source IP address and/or changed destination IP address associated with the second gateway 18. The processing unit 1001 and/or the changing module 1003 may be configured to change the IP address by being configured to change the source IP address and/or the destination IP address, associated with the first gateway 13, of packets of the session for the wireless device 10, to the changed source IP address and/or changed destination IP address associated with the second gateway 18. This may be implemented by a first NAT. The network node 100 may be configured to change the IP address by being configured to change the changed source IP address and/or the changed destination IP address, associated with the second gateway, of packets of the session for the wireless device 10, to the source IP address and/or the destination IP address associated with the first gateway 13. The processing unit 1001 and/or the changing module 1003 may be configured to change the IP address by being configured to change the changed source IP address and/or the changed destination IP address, associated with the second gateway, of packets of the session for the wireless device 10, to the source IP address and/or the destination IP address associated with the first gateway 13. This may be implemented by a second NAT.

The network node 100 is further configured to forward the one or more packets of the session towards the communication network node 15 or the wireless device 10. The network node 100 may comprise a forwarding module 1004. The processing unit 1001 and/or the forwarding module 1004 may be configured to forward the one or more packets of the session towards the communication network node 15 or the wireless device 10.

The network node 100 further comprises a memory 1005. The memory comprises one or more units to be used to store data on, such as NATs, IP addresses, packets, identities, applications to perform the methods disclosed herein when being executed, and/or similar.

The methods according to the embodiments described herein for the network node 100 are respectively implemented by means of e.g. a computer program 1006 or a computer program product, comprising instructions, i.e., software code portions, which, when executed on at least one processor, cause the at least one processor to carry out the actions described herein, as performed by the network node 100. The computer program 1006 may be stored on a computer-readable storage medium 1007, e.g. a disc or similar. The computer-readable storage medium 1007, having stored thereon the computer program, may comprise the instructions which, when executed on at least one processor, cause the at least one processor to carry out the actions described herein, as performed by the network node 100. In some embodiments, the computer-readable storage medium may be a non-transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a network node or OSS node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by an Operation and Support System (OSS) node for handling communication between a wireless device and a communication network node in a communication network, wherein the communication network comprises a first radio access node associated with a first gateway and a second radio access node associated with a second gateway, the method comprising:
   determining to initiate a change of an Internet Protocol (IP) address for the wireless device;
   identifying a session of packets for the wireless device, wherein the session is run over a protocol that supports session continuity even though source or destination IP addresses change in the packets;
   triggering, at a network node or another network node, the change of the IP address associated with the first gateway for the wireless device, of the packets of the session, to a changed IP address associated with the second gateway; and
   ordering, the network node or the other network node, in the communication network to stop changing the IP address associated with the first gateway for the wireless device.

2. The method according to claim 1, wherein the determining to initiate the change of the IP address comprises determining that the wireless device is handed over from the first radio access node to the second radio access node.

3. The method according to claim 1, wherein the triggering, at the network node or the other network node, the change of the IP address associated with the first gateway comprises transmitting a request, to the network node or the other network node, in the communication network, and wherein the request comprises requesting, the network node or the other network node, to initiate the change of the IP address for the wireless device.

4. The method according to claim 3, wherein the change comprises changing at least one of a source IP address and a destination IP address, associated with the first gateway, of the packets of the session for the wireless device, to at least one of a changed source IP address and a changed destination IP address associated with the second gateway.

5. The method according to claim 3, wherein the triggering, at the network node or the other network node, the change of the IP address associated with the first gateway further comprises transmitting an additional request to the other network node or the network node, and wherein the additional request comprises requesting the other network node or the network node to initiate a second change of the packets of the session from the changed IP address associated with the second gateway to the IP address associated with the first gateway for the wireless device.

6. A method performed by a network node for handling communication between a wireless device and a communication network node in a communication network, wherein the communication network comprises a first radio access node associated with a first gateway and a second radio access node associated with a second gateway, the method comprising:
   receiving a request from an Operations and Support System (OSS) node, wherein the request comprises requesting the network node to initiate a change of an Internet Protocol (IP) address associated with the first gateway or the second gateway for the wireless device, of packets of a session for the wireless device, to a changed IP address associated with the second gateway or the first gateway;
   changing the IP address associated with the first gateway or the second gateway for the wireless device, of one or more packets of the session to the changed IP address associated with the second gateway or the first gateway, wherein the session is run over a protocol that supports session continuity even though source or destination IP addresses change in the one or more packets, and wherein the changing the IP address associated with the first gateway or the second gateway is performed until receiving an interrupt indication from the OSS node indicating to stop changing the IP address associated with the first gateway for the wireless device; and
   forwarding the one or more packets of the session towards the communication network node or the wireless device.

7. The method according to claim 6, wherein the changing the IP address associated with the first gateway or the second gateway is implemented by a Network Address Translation function mapping the changed IP address associated with the second gateway or the first gateway to the IP address associated with the first gateway or the second gateway.

8. The method according to claim 6, wherein the changing the IP address associated with the first gateway or the second gateway comprises changing at least one of a source IP address and a destination IP address, associated with the first gateway, of the one or more packets of the session for the wireless device, to at least one of a changed source IP address and a changed destination IP address associated with the second gateway.

9. The method according to claim 6, wherein the changing the IP address associated with the first gateway or the second gateway comprises changing at least one of a changed source IP address and a changed destination IP address, associated with the second gateway, of the one or more packets of the session for the wireless device, to at least one of a source IP address and a destination IP address associated with the first gateway.

10. An Operation and Support System (OSS) node for handling communication between a wireless device and a communication network node in a communication network, wherein the communication network comprises a first radio access node associated with a first gateway and a second radio access node associated with a second gateway, the OSS node comprising:
   a processor; and
   a memory containing instructions which, when executed by the processor, instruct the OSS node to perform operations to:
      determine to initiate a change of an Internet Protocol (IP) address for the wireless device;
      identify a session of packets for the wireless device, wherein the session is run over a protocol that supports session continuity even though source or destination IP addresses change in the packets;
      trigger, at a network node or another network node, the change of the IP address associated with the first gateway for the wireless device, of the packets of the session, to a changed IP address associated with the second gateway; and
      order, the network node or the other network node, in the communication network to stop changing the IP address associated with the first gateway for the wireless device.

11. The OSS node according to claim 10, wherein the instructions instruct the OSS node to perform operations to determine to initiate the change of the IP address by being configured to determine that the wireless device is handed over from the first radio access node to the second radio access node.

12. The OSS node according to claim 10, wherein the instructions instruct the OSS node to perform operations to trigger, at the network node or the other network node, the change of the IP address associated with the first gateway by being configured to transmit a request, to the network node or the other network node, in the communication network, and wherein the request comprises requesting, the network node or the other network node, to initiate the change of the IP address for the wireless device.

13. The OSS node according to claim 12, wherein the change comprises changing at least one of a source IP address and a destination IP address, associated with the first gateway, of the packets of the session for the wireless device, to at least one of a changed source IP address and a changed destination IP address associated with the second gateway.

14. The OSS node according to claim 12, wherein the instructions instruct the OSS node to perform operations to trigger, at the network node or the other network node, the change of the IP address associated with the first gateway by being configured to transmit an additional request to the other network node or the network node, and wherein the additional request comprises requesting the other network node or the network node to initiate a second change of the packets of the session from the changed IP address associated with the second gateway to the IP address associated with the first gateway for the wireless device.

15. A network node for handling communication between a wireless device and a communication network node in a communication network, wherein the communication network comprises a first radio access node associated with a first gateway and a second radio access node associated with a second gateway, the network node comprising:
   a processor; and
   a memory containing instructions which, when executed by the processor, instruct the network node to perform operations to:
      receive a request from an Operations and Support System (OSS) node, wherein the request comprises requesting the network node to initiate a change of an Internet Protocol (IP) address associated with the first gateway or the second gateway for the wireless device, of packets of a session for the wireless device, to a changed IP address associated with the second gateway or the first gateway;
      change the IP address associated with the first gateway or the second gateway for the wireless device, of one or more packets of the session to the changed IP address associated with the second gateway or the first gateway, wherein the session is run over a protocol that supports session continuity even though source or destination IP addresses change in the one or more packets, and wherein the instructions instruct the network node to perform operations to change the IP address associated with the first gateway or the second gateway until receiving an interrupt indication from the OSS node indicating to stop changing the IP address associated with the first gateway for the wireless device; and
      forward the one or more packets of the session towards the communication network node or the wireless device.

16. The network node according to claim 15, wherein the instructions instruct the network node to perform operations to change the IP address associated with the first gateway or the second gateway by being configured to implement a Network Address Translation function mapping the changed IP address associated with the second gateway or the first gateway to the IP address associated with the first gateway or the second gateway.

17. The network node according to claim 15, wherein the instructions instruct the network node to perform operations to change the IP address associated with the first gateway or the second gateway by being configured to change at least one of a source IP address and a destination IP address, associated with the first gateway, of the one or more packets of the session for the wireless device, to at least one of a changed source IP address and a changed destination IP address associated with the second gateway.

18. The network node according to claim 15, wherein the instructions instruct the network node to perform operations to change the IP address associated with the first gateway or the second gateway by being configured to change at least one of a changed source IP address and a changed destination IP address, associated with the second gateway, of the one or more packets of the session for the wireless device, to at least one of a source IP address and a destination IP address associated with the first gateway.

* * * * *